UNITED STATES PATENT OFFICE.

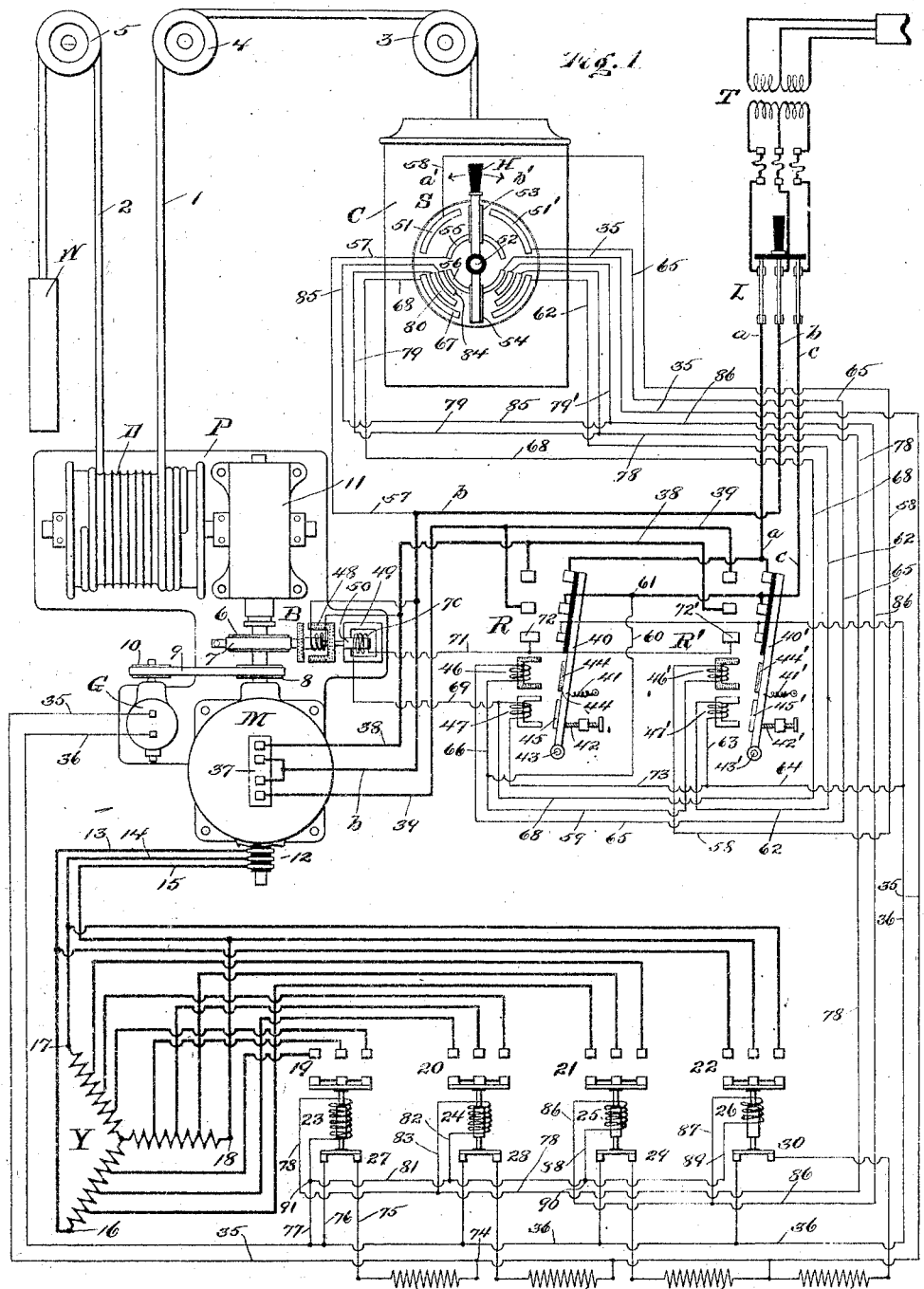

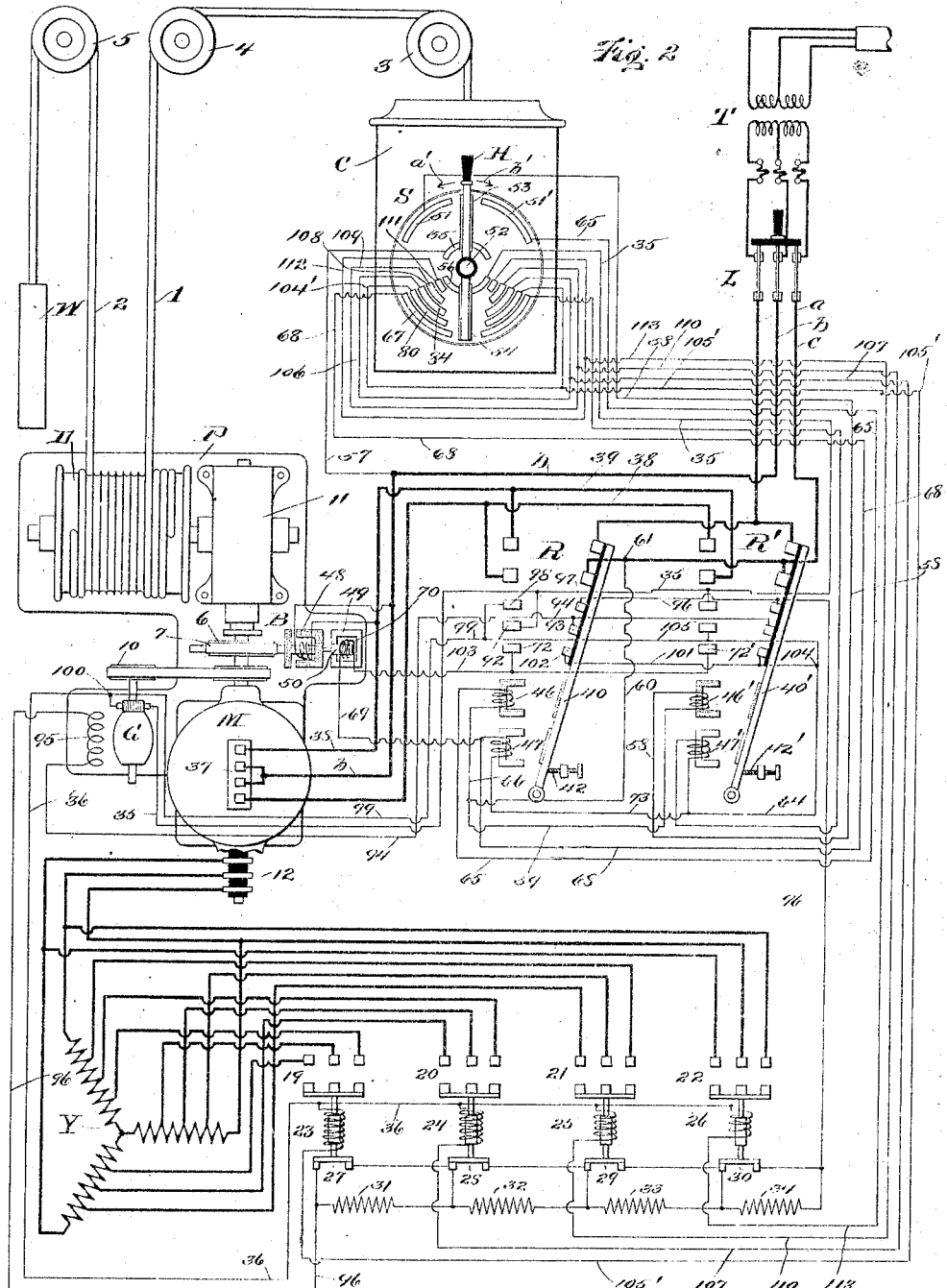

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

VARIABLE-SPEED MOTOR-CONTROLLING APPARATUS.

1,005,355.

Specification of Letters Patent.  Patented Oct. 10, 1911.

Application filed March 13, 1908. Serial No. 420,831.

*To all whom it may concern:*

Be it known that I, AUGUST SUNDH, a citizen of the United States, residing in Yonkers, in the county of Westchester and State of New York, have invented a new and useful Improvement in Variable-Speed Motor-Controlling Apparatus, of which the following is a specification.

My invention relates to motor-controlling apparatus and one of its objects is the provision of means for controlling the acceleration of a motor by current from a generator running with the motor.

A further object of the present invention is to provide in combination with a generator, running with the motor, and means for controlling the starting and acceleration of the motor, a manual switch to control the variation of speed of the motor.

Another object of the present invention is the provision of a generator to retard the speed of a motor and means for varying the retardation in accordance with the change of speed desired.

Other objects of the present invention will appear hereinafter, the novel combinations of elements being set forth in the appended claims.

In the accompanying drawings, Figure 1 represents diagrammatically an electric elevator system with my invention applied thereto; and Fig. 2 is a diagrammatic illustration of an electric elevator system including a modification of my invention.

Referring to Fig. 1, it will be seen that a car C is connected by means of the cable 1 to the hoisting drum D, of the hoisting apparatus P, said cable passing over the sheaves 3 and 4. A drum counterweight W is connected by means of the cable 2 passing over the sheave 5 to the drum D.

M designates a motor which is directly connected to the gearing 11 of the hoisting apparatus.

S designates a manual variable speed-controlling switch in the car, B the brake apparatus associated with the motor shaft, R, R', the reversing switches, Y the starting resistance, and G a direct current generator connected to run with the motor and to supply current to the accelerating apparatus.

The brake apparaus B comprises an alternating current electro-magnet 48 for releasing the brake and a direct current magnet 49 for holding said brake in released position.

6 designates the brake pulley and 7 the brake band.

The generator G is in this instance connected to run with the motor by means of the pulleys 8 and 10 and the belt 9.

The starting resistance Y is connected to the slip rings 12 of the alternating current motor M by means of the leads 13, 14, 15, these leads being connected directly to the outermost terminals 16, 17 and 18 of said resistance. This starting resistance is made sectional and connected at various points to the fixed contacts of the accelerating switches 19, 20, 21 and 22. These switches are adapted to be closed by means of the electro-magnets 23, 24, 25 and 26, respectively. The magnet 23 will in this instance operate first and then the others in succession, this being indicated by the variation in the number of windings of said electro-magnets. The solenoids of these electro-magnets are connected in parallel and therefore the magnet having the greatest number of ampere turns, in this instance that designated 23, will be the first to operate. The accelerating magnets also control the normally closed switches 27, 28, 29 and 30 which are respectively connected to the resistances 31, 32, 33 and 34, the latter being arranged in parallel between the leads 35 and 36 of the direct current generator G. This generator may be series or shunt wound, or of any other type, and is so arranged that its field connections are reversed every time the direction of rotation of the generator armature is reversed so that the current through the field windings may always be in the same direction. The means for reversing the field connections is not shown, as it is old and well known in the art. Preferably, however, I employ a series wound generator having its poles permanently magnetized so that upon starting it will generate current quickly. It should be noted also that the resistances 31, 32, 33 and 34 being arranged in parallel instead of in series, the external resistance of the generator G will be at a minimum upon starting, and will therefore permit its field to be built more quickly so that the requisite voltage is obtained for operating the switch 19 a short time after the motor M starts. Then as the motor M increases in speed, the voltage of the generator G will also increase to effect the successive operation of the switches 19, 20, 21 and 22. Furthermore, upon the closing of switch 19 the switch 27 is opened, thereby cutting out the resistance 31. The resistances 32, 33 and 34 are then cut out by the switches 28, 29 and 30, respectively, but when this occurs the circuits through the holding magnets 47 or 47' and 70 will have been closed.

T designates a transformer for reducing the potential of the multiphase alternating current to be conducted through the main line switch L and the leads $a$, $b$, $c$, the lead $b$ being connected directly to the motor, and the leads $a$ and $c$ to the reversing switches R, R', which in turn are connected by way of the leads 38 and 39 to the other motor terminals 37. The alternating current magnets for releasing the brake and for closing the reversing switches are preferably single-phase magnets connected across any two of the primary circuit leads of the motor.

If the switch S in the car C is operated by moving the handle H in the direction of the arrow $b'$, the bridge piece 53 will engage the segment 51' and thereupon a single-phase circuit will be closed which may be traced from the main $b$ through the wire 57, contact segment 55, bridge piece 53, segment 51', wire 65, magnet 46, and wires 66, 60, to the point 61 on the main $c$. The armature 44 will be attracted by the magnet 46 to move the contact-carrying lever 40 to its circuit closing position against the action of the spring 41. This lever 40 is pivoted at 43 and normally lies against the adjustable stop 42. When the switch R is thus closed the magnet 48 will be energized to release the brake. Substantially at the same time or a short time after the bridge piece 53 connects the segments 55 and 51', the bridge piece 54 engages the segment 67 to connect the same with the segment 56. A direct current circuit is thereby closed from the generator G through the wire 35, segment 56, bridge piece 54, segment 67, wire 68, magnet 47, wire 73, wire 64 and thence back to the generator G through the wire 36. A shunt circuit is also closed through wire 69, magnet solenoid 70, wire 71, and the contact 72 to the return wire 36. When the switch R is closed the armature 45 is moved up against the poles of the magnet 47 and when the magnets 47 and 49 are energized by direct current they will respectively hold the switch R in closed position and the brake released. At this time the motor can start and operate only at a slow speed for the reason that all the starting resistance Y is maintained in circuit with the rotor of the motor. Upon further movement of the handle H, however, so that the bridge piece 54 will engage the segment 80, a circuit will be closed through the magnet 23 to effect the closure of the switches 19 and 20 successively, and thus permit the motor to increase in speed. This circuit may be traced from the generator G by way of wire 35 to segment 56 of the switch S and thence through the bridge piece 54, segment 80, wires 79, 78, magnet 23, wire 77, to the return wire 36. A shunt circuit will also be closed from the wire 78 through the wire 83, magnet 24, wires 82, 81 and 77 to the wire 36. The switches 19 and 20 will be successively closed because they are of different strengths. When the switch in the car is still further operated, a circuit will be closed from wire 35, through segment 56, bridge piece 54, segment 84, wires 85 and 86, magnet 25, and wire 88 to wire 81; also through wire 87 and magnet 26, and wire 89 to wire 81. Now the electro-magnets 25 and 26 will be energized to effect the successive closure of the switches 21 and 22. It will be evident that by moving the handle H so that the bridge piece 54 will be disengaged from the segment 84, the magnets 25 and 26 will be deënergized to effect the opening of the switches 21 and 22, and thereby decrease the speed of the motor. The switches 19 and 20 may be opened in the same manner to operate the motor at its slowest speed without stopping it.

The generator G may be so constructed as not only to furnish current for operating the accelerating apparatus and for holding the brake released and the reversing switch closed, but also to act as a brake on the motor M in reducing its speed. For instance if the motor M has been brought up to full speed and it is desired to operate the same at slower speed, the movement of the switch S to an intermediate position will have the effect of throwing the resistances 33 and 34, or also the resistance 31 and 32 across the generator leads 35 and 36. The throwing of these resistances across the generator leads will decrease the resistance of its external circuit and thereby increase its electro-dynamic braking effect on itself and consequently on the motor M. At high speed the rotor of the motor M may have a large amount of inertia which would not easily be overcome by the simple reinsertion of the starting resistance Y; and since it is not desired to stop the car, the brake apparatus B should not be applied. But it is evident that the resistances 31, 32, 33 and 34 may be so designed as to sufficiently decrease the external resistance of the generator G to cause the same to act as an efficient and effective brake on the motor M to assist in slowing down the same to the speed desired and corresponding to the position of the switch in the car. When the bridge piece 54 is moved off the segment 84, in this instance the switches 21 and 22 will be opened and the resistances 33 and 34 thrown across the leads 35 and 36 by the closure of the switches 29 and 30. By movement of the switch to slow speed position, all the resistance Y is reinserted in the rotor circuit and the switches 27 and 28 closed to insert the resistances 31 and 32 across the leads 35 and 36. Sufficient current at this time still passes through the holding magnets to maintain the reversing switch closed and the electro-mechanical brake released. It will therefore be evident that the generator G will act as a brake on the motor M to slow down the same, and this will be true even when the switch in the car is moved from fast speed position directly to slow speed position when all the resistances 31, 32, 33 and 34 will be thrown across the leads 35 and 36, thus substantially doubling the retarding effect of the generator G and bringing the motor M to its slowest speed almost as quickly as from high speed to an intermediate speed.

In Fig. 2 I have shown the resistances 31, 32, 33 and 34 normally short-circuited, and the switches 27, 28, 29 and 30 connected to them in such a manner that after the accelerating apparatus has operated these resistances will be inserted in series with the generator G. Furthermore, I have provided an additional number of speed-controlling positions for the car switch, each position corresponding to an accelerating magnet switch.

Upon movement of the handle H in the direction of the arrow b', the circuit will be closed as before, through the brake magnet 48 and the reversing switch magnet 46. The reversing switch R will therefore be closed and the motor receive current to start the same at slow speed. When the bridge piece 54 engages the segment 67 a circuit will be closed from the generator G through wire 35, to segment 56 and thence the current passes through the bridge piece 54, segment 67, wire 68, to the holding magnets 47 and 70. From the magnet 47 the circuit continues through wires 73, 64, 105, 99, to the junction 100 near the generator G. The circuit of the magnet 70 is completed through the wire 103, contacts 72, 102, and wires 101, 105 and 99 to the point 100. Upon further movement of the car switch, the bridge piece 54 engages the segment 80 whereupon the circuit will be closed from wire 35 to segment 56, bridge piece 54, segment 80, wires 104', 105', magnet 23 to wire 36 which is the return wire of the generator G. The switch 19 will therefore be closed and the switch 27 opened, the effect of the latter being to insert the resistance 31 in circuit with the shunt field winding 95 of the generator G. The circuit of the shunt field winding 95 is closed by the contact 93 on the switch arm 40 engaging the fixed contact 92. This circuit extends through wire 94, contacts 93, 92, to the armature by way of wire 35. The other side of the shunt field circuit extends through wire 96, contacts 97, 98, and wire 99 to the brush of the armature G near the juncture 100. When the bridge piece 54 engages the segment 84 the switch 20 will be operated and when said bridge piece successively engages the segments 108 and 111, the switches 21 and 22 will be successively closed. It should be noted that when the switch in the car directly controls the energization of the accelerating magnets, the increase of voltage of the generator G corresponding to the increase of speed of the motor M is not of so much importance so long as sufficient current is supplied by the generator G to operate each accelerating magnet in its turn. However, it is evident that the greater the speed of the motor, the greater will be the voltage of the generator G. But by the insertion of the resistances 31, 32, 33 and 34 the shunt field of the generator G will be correspondingly weakened, thus tending to decrease the voltage of the generator G. These resistances and the windings of the accelerating magnets may be so designed that the accelerating switches will be held in closed position for any desired speed of the motor M. When now it is desired to decrease the speed of the motor and its rotor has attained a comparatively high speed, it will be evident that even after part of the resistance Y is reinserted in the rotor circuit, the tendency of the motor would be to slow down only very slowly by reason of the large amount of inertia of the rotor to be overcome. The short-circuiting or cutting out of the field resistances of the generator G will have the effect of causing the latter to assist in retarding the motor and slowing it down to the speed desired, and this retardation by the generator G will be in proportion to the change of the speed desired as indicated by the movement of the switch S. For instance, if the switch S is moved from a high speed position to an intermediate position, one or more of the generator field resistances will be cut out, whereas if the switch is moved from high speed directly to low speed, all of the resistances 31, 32, 33 and 34 will be cut out and the maximum retarding effect of the generator G will be obtained.

It should be noted that in some instances the generator G may be so designed as to have sufficient dynamic braking effect to bring the motor and car to rest or nearly so in order that the brake B may be depended upon merely to hold the motor and car stationary. Therefore by manipulation of the car switch the car may be brought to rest gradually without shock or jar and then held from moving while passengers are passing into or out of the car.

It is obvious that various changes in the details and arrangement of parts may be made by those skilled in the art without departing from the spirit and scope of my invention as defined by the claims. I desire therefore not to be limited to the precise construction herein disclosed.

Having thus fully described my invention, what I claim and desire to have protected by Letters Patent of the United States is:

1. The combination with an alternating current induction motor, of starting resistance therefor, a direct current generator connected to the rotor, and automatic means for substantially simultaneously varying said starting resistance and the current produced by the generator to effect a retardation of the motor in proportion to its speed.

2. The combination with an alternating current motor, of starting resistance therefor, accelerating switches for controlling said resistance, a direct current generator running with the motor, magnets operated by the generator current for closing said accelerating switches successively, and means co-acting with said electro-magnets and switches for causing said generator to assist in reducing the speed of the motor.

3. The combination with an elevator car and hoisting apparatus, therefor, of an electric motor, conductors leading from a source of current for said motor, a second source of current separate from, but dependent upon said motor, and automatic means controlled from the car for regulating the retarding effect of said second source of current upon said motor in proportion to the speed of the motor.

4. The combination with a motor, of a generator connected to run with the motor, means dependent on the current strength of the generator for varying the speed of the motor, and appliances for automatically varying the resistance in the generator circuit upon the operation of said speed-varying means.

5. The combination with a motor, of a generator connected to run with the motor, means for varying the resistance in a circuit of the motor, and automatic appliances for substantially simultaneously varying the resistance in the generator circuit in proportion to the speed of the motor.

6. The combination with a motor, of a generator connected to run with the motor, a starting resistance in the motor circuit, means dependent upon the current strength of the generator for varying said resistance, and appliances for automatically varying the resistance in the generator circuit when said starting resistance is varied.

7. The combination with a motor, of a generator mechanically connected thereto, a starting resistance in the motor circuit, means operated by current from the generator to vary said resistance, and appliances for automatically varying the resistance in the generator circuit as said starting resistance is varied.

8. The combination with a motor, of a generator mechanically connected to run therewith, resistances in the motor and generator circuits, and means controlled by the generator for substantially simultaneously varying said resistances.

9. The combination with a motor, of a generator mechanically connected to run therewith, resistances in the motor and generator circuits, and means dependent on the voltage in the generator circuit for simultaneously varying said resistances.

10. The combination with a motor, of a generator mechanically connected thereto, a starting resistance in the motor circuit, means dependent upon the voltage of the generator circuit for varying said resistance, and automatic appliances for varying the voltage of the generator as said resistance is varied.

11. The combination with a motor, of a generator mechanically connected thereto, a starting resistance in the motor circuit, means dependent upon the voltage of the generator for varying said resistance, and appliances for automatically decreasing the voltage of the generator as said starting resistance is decreased.

12. The combination with an alternating current motor, of a direct current generator, connected to run therewith, a sectional resistance in a circuit of the motor, means operated by current from the generator to vary said resistance, and appliances for varying the voltage of the generator simultaneously with the variation of said resistance.

13. The combination with a motor, of a generator connected to run therewith, a sectional resistance in a circuit of the motor, manually controlled means for varying said resistance, and appliances controlled by the generator for varying the voltage of the generator circuit substantially as said resistance is varied.

14. The combination with a motor, of a generator connected to run therewith, a resistance in the motor circuit, manually controlled means for increasing or decreasing the amount of said resistance in the motor circuit, and appliances for increasing the voltage of the generator as said resistance is increased and decreasing the voltage of the generator as said resistance is decreased.

15. The combination with a motor, of a generator connected to run therewith, a sectional resistance in the motor circuit, a sectional resistance in the generator circuit, and manually controlled means for simultaneously increasing the resistance in the motor circuit and decreasing the resistance in the generator circuit, or decreasing the resistance in the motor circuit and increasing the resistance in the generator circuit.

16. The combination with a motor, of a generator connected to run with the motor in opposition thereto, manually controlled means dependent upon the voltage of the generator for effecting a variation in the speed of the motor, and devices associated with said means and operative to respectively increase or decrease the opposing action of the generator as the speed of the motor is decreased or increased.

17. The combination with a motor, of a resistance in the motor circuit, a generator connected to run with the motor, resistances in the generator circuit, switches controlling said resistances, and an electro-magnet connected to each of said switches and having its winding in the generator circuit.

18. The combination with a motor, of a generator connected to run with the motor, resistances in the motor circuit, resistances in the generator circuit, switches controlling said resistances, electro-magnets operatively connected to the switches and having their windings in the generator circuit, and manual means for successively opening or closing the circuits of the magnet windings.

19. The combination with a motor, of a starting resistance in a circuit of the motor, a direct current generator connected to run with the motor, means dependent upon the voltage of the generator for gradually cutting out the starting resistance as the speed increases and appliances for gradually increasing the resistance of the generator circuit as the starting resistance is decreased.

20. The combination with a motor, of a generator, a starting resistance in the motor circuit, means operated by current from the generator to vary said resistance, and means for varying the resistance in the generator circuit as said starting resistance is varied.

21. The combination with a motor, of a generator connected thereto, a starting resistance in the motor circuit, means operated by current from the generator to vary said resistance, and appliances for varying the resistance in the generator circuit as said starting resistance is varied.

In testimony whereof, I have signed my name to this specification in the presence of two subscribing witnesses.

AUGUST SUNDH.

Witnesses:
W. H. BRADY,
CHAS. M. NISSEN.